United States Patent [19]
Schluter et al.

[11] 3,802,755
[45] Apr. 9, 1974

[54] TWO-ROW ANTIFRICTION BEARING

[75] Inventors: Wilhelm Schluter, Dortmund-Gartenstadt; Heinz Pohler, Herdecke-Kirchende, both of Germany

[73] Assignee: Hoesch Aktiengesellschaft, Dortmund, Germany

[22] Filed: Apr. 25, 1973

[21] Appl. No.: 354,088

[52] U.S. Cl. .............................................. 308/227
[51] Int. Cl. .......................................... F16c 33/58
[58] Field of Search ............ 308/216, 227, 230, 231

[56] References Cited
UNITED STATES PATENTS
3,361,500  1/1968  Pohler............................... 308/216

*Primary Examiner*—Charles J. Myhre
*Assistant Examiner*—Frank Susko
*Attorney, Agent, or Firm*—Walter Becker

[57] ABSTRACT

A two-row antifriction bearing for absorbing simultaneously occurring axial, radial, and moment loads, in which in a divided bearing ring there are provided a first and a second wire body each forming one raceway for the roll bodies, while in a non-divided bearing ring there is provided a third wire body forming two raceways for the roll bodies. The roll bodies are supported between and by the raceways of the first and second wire bodies on one hand and by the raceways of the third wire body on the other hand, the supporting angles of the raceways being arranged in conformity with the load components to be absorbed.

4 Claims, 6 Drawing Figures

TWO-ROW ANTIFRICTION BEARING

The present invention relates to a double row antifriction bearing for absorbing simultaneously occurring axial radial and moment loads, in which wire bodies serve as raceway for the antifriction bodies, said wire bodies being composed of an outer and an inner bearing ring provided with recesses or grooves, while one or the other of the two bearing rings is divided.

It is known to equip antifriction bearings with antifriction bodies in which each antifriction body row has at least four wire bodies associated therewith when a ball bearing is involved, or has at least two wire bodies associated therewith when roller bearings are involved. When employing balls, the bearing may have one row only, whereas when employing rollers it must have two rows in order to be able to absorb axial loads from both directions together with radial loads and moment loads.

The carrying ability of each of such antifriction bearings depends on the number and the diameter of the roller bodies. Consequently, when antifriction bearings with higher carrying capacity are required for absorbing the three types of loads, namely, axial loads, radial loads, and moment forces, the structural height and the diameter of the antifriction bearings have by necessity to be selected greater. On the other hand, if bearings for higher bearing capabilities are desired, they will encounter certain limits with regard to diameter and greater structural height because it is difficult to mount bearings with such dimensions, inasmuch as frequently only a limited space is available. Therefore, with ball bearings which are suitable only for absorbing forces in axial direction it has been suggested to reduce the dimensions of a two-row antifriction bearing by providing six wire bodies as raceways instead of eight wire bodies. To this end, two wire bodies are arranged between adjacent rows of balls, so that they will serve as raceways at the same time for both rows of balls.

It is an object of the present invention to provide an antifriction bearing of the above mentioned general type which with the same bearing capability will, over other designs, require only a minimum number of wire bodies in order to keep the dimensions for their installation within as narrow as possible limits while reducing the rotary resistance, and also in order when employing rollers as roller bodies to avoid that the rollers are located at a slight angle relative to the raceway and have only one edge in contact with the raceway, inasmuch as this is not desirable.

These and other objects and advantages of the invention will appear more clearly from the following specification, in connection with the accompanying drawings, in which.

Figure 1:
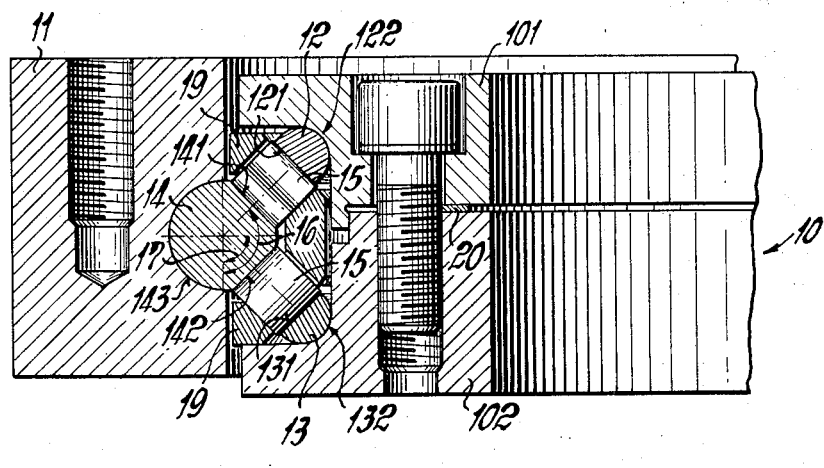
FIG. 1 is a two-row antifriction bearing, of which only a portion has been shown in section, with rollers and a divided inner ring.
Figure 2:
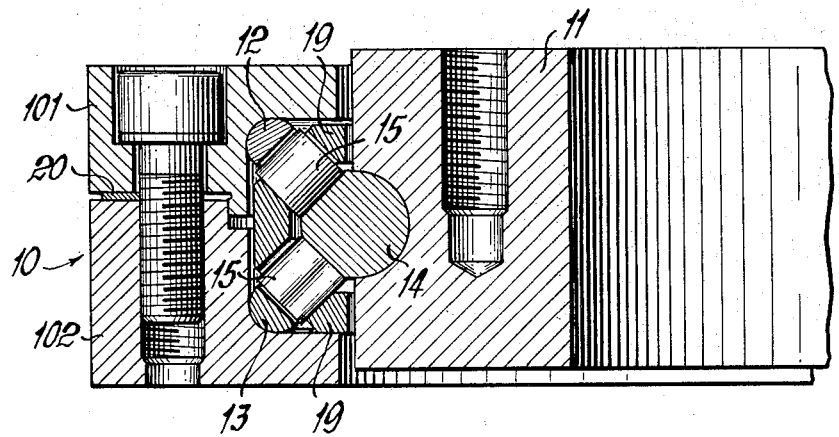
FIG. 2 illustrates an antifriction bearing according to FIG. 1, but with a divided outer ring.
Figure 3:
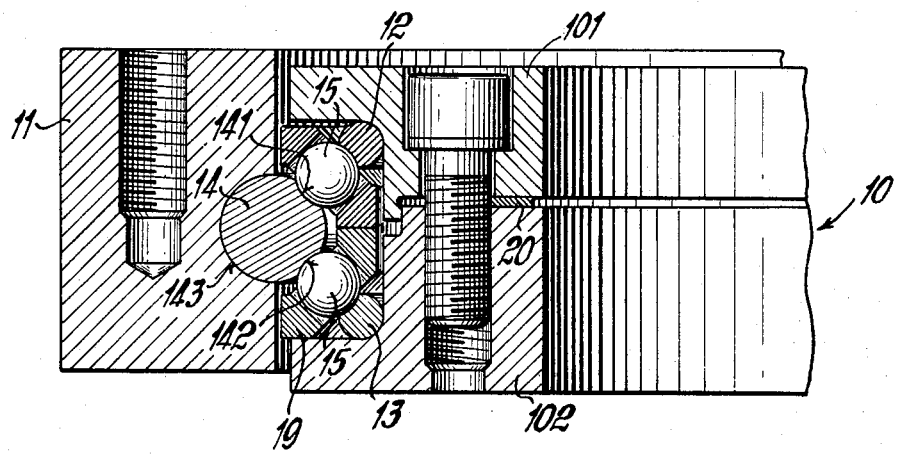
FIG. 3 represents a section through a portion of a double-row antifriction bearing with rows of balls arranged in a divided inner ring.
Figure 4:
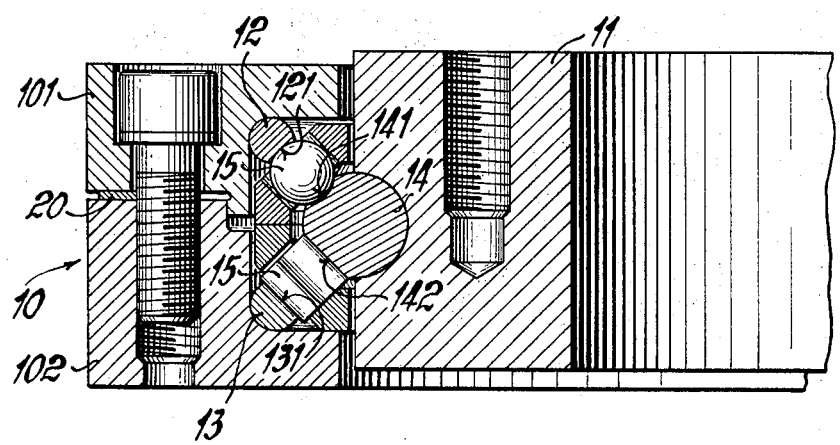
FIG. 4 is a portion of a two-row antifriction bearing with one row of balls and one row of rollers and with a divided outer ring.

The two-row antifriction bearing, according to the present invention, for simultaneously absorbing axial radial and moment loads is characterized primarily in that in the divided bearing ring there are arranged two wire bodies with one raceway each, and that in the non-divided bearing ring there is provided a wire body with two raceways, while the antifriction bodies located therebetween rest on the raceways associated with each other, the supporting angles being determined in conformity with the occurring load components.

According to a further feature of the invention, the back of the wire bodies which engages the recesses or grooves is, cross-sectionwise, arched in a circular way while the raceways of the wire bodies are designed in conformity with the geometric shape of the antifriction bodies.

Expediently, according to another embodiment of the invention, the wire body arranged in the non-divided bearing ring is so designed that it has a polygonal cross section, preferably a square cross section, or similar thereto.

The bearing rings may be of steel, light metal, bronze, or a synthetic material, and if they are operatively connected to a drive, for instance, through the intervention of a pinion, they are provided with teeth which, depending on the arrangement and location of the drive, may be inner teeth or outer teeth.

The roller bodies are, by cages or spacer members, kept in spaced relationship to each other. The cage may form one piece or two pieces. Also, cage segments may be employed. When employing divided bearing rings, the bearing play may be adjusted by shims, or the bearing system may be preloaded.

In conformity with the magnitude of the individual loads acting upon the antifriction bearing, the diameter of the antifriction bodies is for both rows of antifriction bodies, selected either of the same, or of different magnitude.

For the same reason, rollers may be employed for the main supporting row, whereas for the safety row balls will suffice as antifriction bodies. When employing rollers in both rows of antifriction bodies, the rollers may have the same diameter and length or may have a different diameter and length. For all loads in which the rollers are necessary for supporting the axially effective main load, whereas the second row of antifriction bodies merely serves for guiding in radial direction, a ball - roller combination may be employed, so that a lifting off of the antifriction bearing will be avoided. Furthermore, the supporting angle for each of the two rows of antifriction bodies may be selected of different magnitude while, for instance, the supporting angle for one row of antifriction bearings has the value 0° and for the other row of antifriction bodies has the value 90°. Of course, the supporting angles may also be provided for all intermediate values, as for instance, 30°/60°, 45°/45°, etc., in conformity with the respective intended loads.

It is particularly important for the rolling kinematics that with the subject matter according to the invention, the axis of rotation of the roller body is always constant so that a jamming will be avoided regardless of whether as antifriction bodies, balls or rollers, or a combination thereof is employed. Moreover, the rotary resistance is considerably reduced in view of the reduced number of wire bodies.

Referring now to the drawings in detail, with a two-row antifriction bearing comprising an outer ring and an inner ring of which either one or the other is designed as a divided bearing ring in conformity with the required design, the drawing shows the respectively divided bearing ring as a bearing ring unit 10 so that the two bearing ring sections are respectively designated with the reference numerals 101 and 102, whereas the non-divided bearing ring is designated with the reference numeral 11.

In the divided bearing ring 10 (FIG. 1) with the two bearing ring sections 101 and 102, there are inserted two wire bodies 12,13 each having a raceway 121, 131. In the non-divided bearing ring 11 (FIG. 1) one wire body 14 is provided with two raceways 141, 142. Of the raceways 141, 121; 142, 131 each two raceways associated with each other are resting against each other by interposed antifriction bodies 15. The supporting angles 16, 17 of the antifriction bodies 15 are fixed in conformity with the occurring load components and are either of the same magnitude or of different magnitudes. The magnitude of the supporting angle 16, 17 with the values from 0° to 90° are measured from the bearing plane.

The backs 122, 132, 143 of the wire bodies 12, 13, 14 are arched along a circle. The raceways 121, 131, 141 and 142 of the wire bodies 12, 13, 14 are designed in conformity with the geometric shape of the roller bodies 15, i.e. as balls or rollers.

Figure 5:
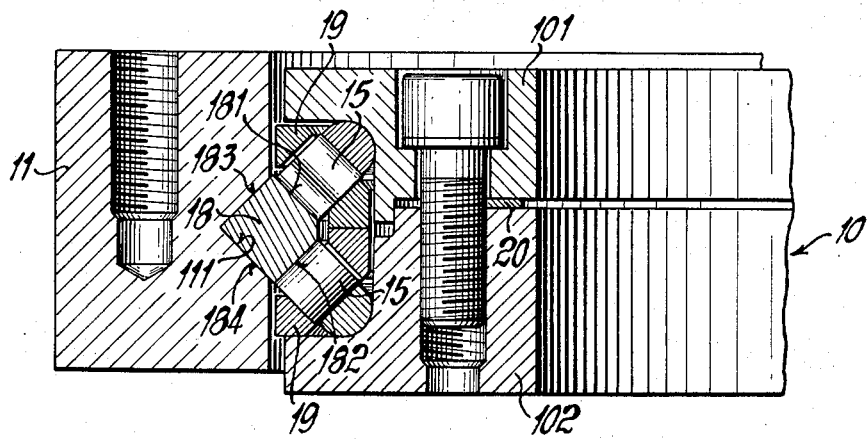
FIG. 5 is a portion of a two-row antifriction bearing with rollers in which the wire body, which in the non-divided outer ring has two raceways, has a polygonal cross section.

In FIG. 5, the wire body has a polygonal cross section similar to a square with the raceways 181, 182 for the roller bodies 15. In this connection, the back of the wire body 18 is formed by the surfaces 183, 184 so that a recess or groove 111 serving as wire body bed is correspondingly formed in the bearing ring 11. The roller bodies 15 are held in spaced relationship to each other by cages 19 or spacer members (not illustrated).

When divided bearing means 10 are provided, the distance between the bearing sections 101, 102 is set by means of spacer members 20. In view of the supporting angles of 45° which are the same for both rows of antifriction bodies, the axial and radial play are set simultaneously.

Figure 6:
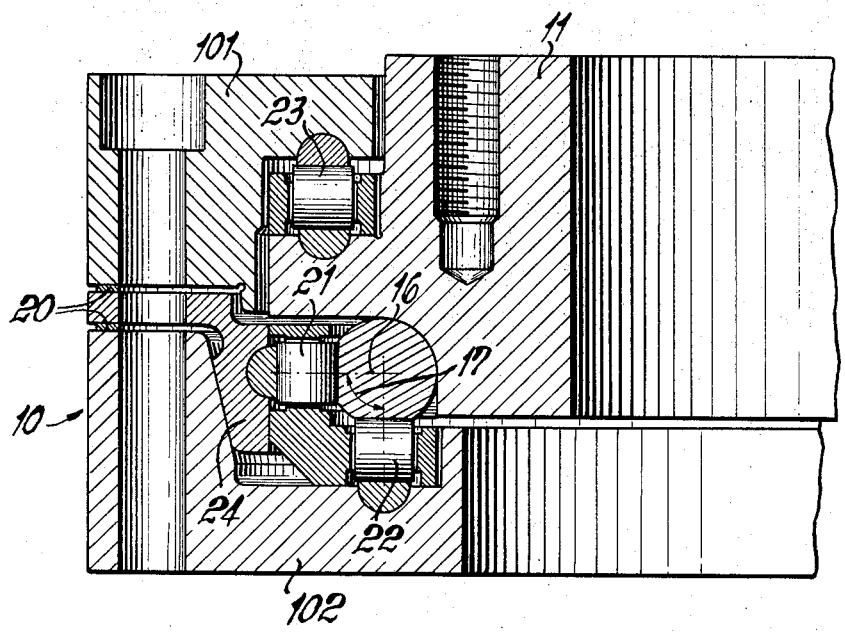
FIG. 6 shows a portion of a multi-row antifriction bearing with different supporting angles for the rollers resting on three wire bodies.

FIG. 6 shows a three-row antifriction bearing in order to illustrate that the principle of the invention is not limited to a two-row antifriction bearing. According to this embodiment, the supporting angle 16 for the radial roller row 21 amounts to 0°, and the supporting angle 17 for the axial roller row 22 amounts to 90°. An additional row 23 of rollers is arranged as holding way which prevents a lifting off of the antifriction elements. Of the two spacer members 20, the lower ones are used for post adjusting the radial play through a conical ring 24. The axial play is adjusted by the upper spacer members 20.

As will be evident from the above, the advantages realized with the present invention consist primarily in that with the same maximum supporting ability of other designs, only three wire bodies are necessary. Moreover, the supporting angles can precisely be adapted to the occurring axial, radial and moment loads. If the radial load is predominant and the axial load in both directions is relatively low, a small supporting angle is obtained which is measured from the bearing plane. When the axial load is predominant and the radial load is relatively low, a great supporting angle is obtained up to a magnitude of 90°. The construction according to the present invention is furthermore characterized by a reduced bearing cross section as to its height and also as to its diameter.

It is, of course, to be understood that the present invention is, by no means, limited to the particular showing in the drawings, but also comprises any modifications within the scope of the appended claims.

What we claim is:

1. A two-row antifriction bearing for absorbing simultaneously occurring axial loads, radial loads, and moment loads, which includes: an inner bearing ring, an outer bearing ring, one of said bearing rings being divided into two bearing ring sections and having its plane of division extending transverse to the axis of said antifriction bearing, the other one of said bearing rings being an undivided single ring, a first wire body arranged in one of said two bearing ring sections and engaging a portion thereof, a second wire body arranged in the other one of said bearing sections and engaging a portion thereof, each of said first and second wire bodies having one raceway for roll bodies, a third wire body arranged in and engaging a portion of said undivided single ring, and having two raceways for respective cooperation with the raceways of said first and second wire bodies and roll bodies interposed between and supported by the raceways of said third wire body and the respective cooperating raceways of said first and second wire bodies, and means engaging said roll bodies and holding the same in spaced relationship to each other, the raceways of said third wire body forming cross sectionally an angle with each other in conformity with the load components to be absorbed, and the raceways of said first and second wire bodies forming cross sectionally an angle with each other in conformity with said angle cross sectionally formed by the raceways of said third wire body.

2. An antifriction bearing according to claim 1, in which that surface portion of each of said wire bodies which engages the respective pertaining bearing ring portion is cross sectionally circularly curved, and in which the raceways of said wire bodies are designed in conformity with the geometric shape of said roll bodies.

3. An antifriction bearing according to claim 1, in which that surface of each of said first and second wire bodies which engages the respective pertaining bearing ring portion is cross sectionally circularly curved, and in which said third wire body has a polygonal cross section.

4. An antifriction bearing according to claim 1, in which said third wire body has an approximately rectangular cross section.

* * * * *

UNITED STATES PATENT OFFICE
CERTIFICATE OF CORRECTION

Patent No. 3,802,755      Dated April 9, 1974

Inventor(s) Wilhelm Schluter, et al

It is certified that error appears in the above-identified patent and that said Letters Patent are hereby corrected as shown below:

On the cover sheet,

[73] Assignee:"Hoesch Aktiengesellschaft Dortmund, Germany"

should read -- [73] Hoesch Werke Aktiengesellschaft Dortmund, Germany --.

Signed and Sealed this

Thirty-first Day of August 1976

[SEAL]

Attest:

RUTH C. MASON
*Attesting Officer*

C. MARSHALL DANN
*Commissioner of Patents and Trademarks*